Aug. 26, 1958
B. E. LENEHAN
2,849,680
ELECTRICAL INSTRUMENTS RESPONSIVE TO
ALTERNATING ENERGIZATION
Filed May 31, 1952
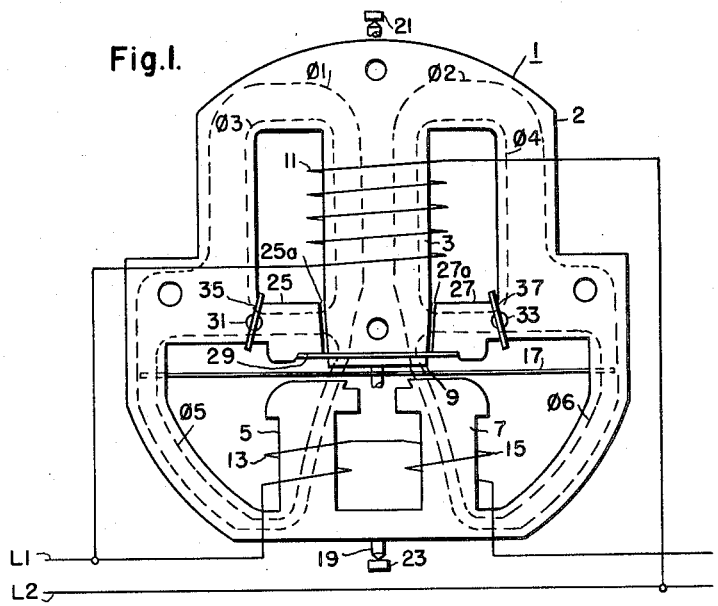
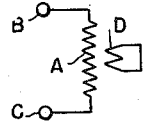
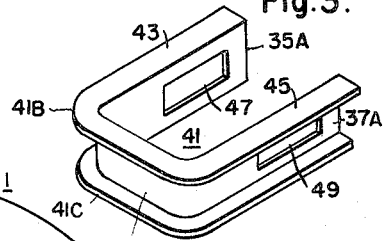
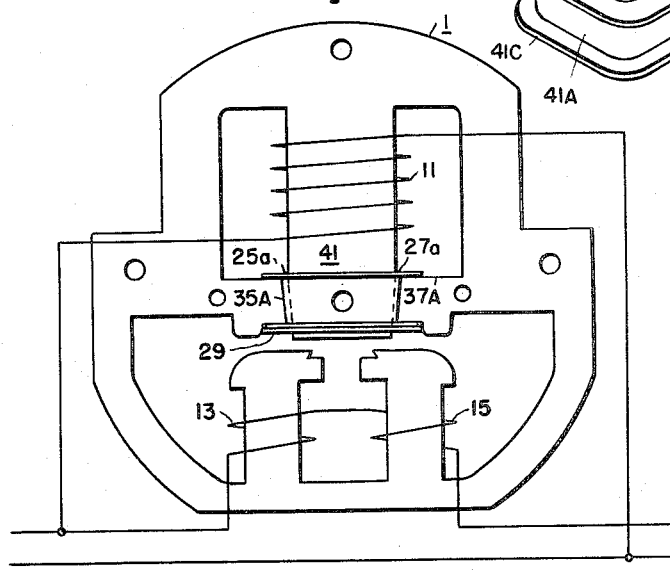
WITNESSES:
INVENTOR
Bernard E. Lenehan.
BY
ATTORNEY _United States Patent Office_

2,849,680
Patented Aug. 26, 1958

2,849,680

ELECTRICAL INSTRUMENTS RESPONSIVE TO ALTERNATING ENERGIZATION

Bernard E. Lenehan, Bloomfield, N. J., assignor to Westinghouse Electric Corporation, East Pittsburgh, Pa., a corporation of Pennsylvania Application May 31, 1952, Serial No. 290,895

8 Claims. (Cl. 324—138)

This invention relates to temperature-compensated devices responsive to alternating energization, and it has particular relation to temperature-compensated induction electrical instruments having voltage windings.

Devices designed for alternating current energization may have properties subject to variation with temperature. Thus a simple inductance coil comprising a winding constructed of a material having a substantial temperature cofficient of resistance, such as copper, has a resistance which varies as a function of temperature. In accordance with the invention such a temperature-responsive variation may be compensated by a closed winding mutually coupled to the inductance coil and having a properly selected number of turns and a properly selected resistance.

The invention is applicable to induction electrical instruments which are employed in various applications. For example, they may be employed as indicating instruments, integrating meters and relays. Although elements of the invention may be employed in devices designed for these various applications, the invention is particularly suitable for induction watthour meters and will be described with reference to such meters.

A conventional induction watthour meter may include a magnetic structure having associated therewith voltage and current windings. These windings are associated with pole pieces of the magnetic structure to direct into an air gap provided in the magnetic structure magnetic fluxes which produce a shifting magnetic field. An electroconductive armature is disposed in the air gap for rotation by the shifting magnetic field relative to the magnetic structure.

Watthour meters may be mounted either indoors or outdoors. When installed, they may be subjected to temperatures which vary over a substantial range, such as, for example, a range of −20° C. to +50° C. Preferably, the meter should operate accurately over the entire range of temperatures to which the meter may be subjected.

A device such as an induction watthour meter is intended to measure a function of the product of two alternating quantities and the phase angle between the quantities. Consequently, the effects of variations in temperature must be considered not only for the magnitudes of the alternating quantities but for the phase angle between the quantities.

The necessity for temperature compensation is well understood in the art. The compensation commonly provided for watthour meters is divided into Class 1 temperature compensation, and Class 2 temperature compensation. The invention will be described with particular reference to Class 2 compensation. Examples of prior art Class 2, temperature compensation, will be found in the Oman Patent 1,764,339, which issued June 17, 1930, and in the Barnes Patent 2,363,284, which issued November 21, 1944.

In accordance with the invention, magnetic flux produced by a winding requiring temperature compensation, is divided into a plurality of components. Each of these components is provided with closed electroconductive or lagging windings. By proper correlation of the temperature-responsive characteristics of the lagging windings, proper temperature compensation may be provided for the winding producing the magnetic flux.

In a specific embodiment of the invention, magnetic flux produced by the voltage winding of an induction watthour meter is divided into a driving component which enters the meter armature and a leakage component which does not enter the armature. Separate lagging means links each of the components. By providing a temperature coefficient of resistance for the lagging means associated with the driving magnetic flux which is lower than that of the lagging means associated with the leakage magnetic flux, Class 2 temperature compensation may be provided for the meter. Furthermore, by adjusting the amount of magnetic flux linked by one or more of the lagging means, suitable adjustments of the meter may be effected.

It is therefore an object of the invention to provide an electrical device having improved temperature compensation.

It is another object of the invention to provide an inductance coil with a closed, mutually-coupled winding designed to compensate the inductance coil for variations in properties due to temperature changes.

It is a further object of the invention to provide an electrical device having a winding which, when energized by an alternating quantity, directs magnetic flux into two paths and provided with separate lagging means for each of the paths having different temperature coefficients of the impedance selected to provide temperature compensation for the device.

It is also an object of the invention to provide an induction watthour meter having voltage windings which, when energized by an alternating voltage, directs a driving magnetic flux through an electroconductive armature and a leakage magnetic flux away from the armature, wherein lagging means is provided for each of the flux components, and wherein the temperature coefficient of resistance of the lagging means associated with the driving magnetic flux is less than that of the lagging means associated with the leakage magnetic flux to provide Class 2 temperature compensation, for the meter.

Other objects of the invention will be apparent from the following description taken in conjunction with the accompanying drawing, in which:

Figure 1 is a view in elevation with parts schematically shown of an induction electrical device embodying the invention;

Fig. 2 is a view in elevation with parts schematically shown of an induction electrical device embodying a modified form of the invention;

Fig. 3 is a view in perspective of a winding unit suitable for the device of Fig. 2; and Fig. 4 is a schematic view of compensated inductance coil embodying the invention.

The effect of temperature variations on components of an electrical system may be considered first with reference to a simple inductance coil or reactor A (Fig. 4) which is connected across two terminals B and C for energization from a source of alternating current. It will be assumed that the reactor has an air core or that it has a core constructed of soft magnetic iron having a negligible temperature coefficient of permeability. Although alternating current sources of different frequencies and voltages may be employed, it will be assumed that the source has a power frequency such as 60 cycles per second.

In practice, reactors commonly employ a winding constructed of a material having a substantial temperature coefficient of resistance. Such a reactor would have a resistance which varies appreciably with variations in temperature thereof.

In order to compenate for the variation in resistance of a reactor, the reactor is provided with a mutually-coupled closed winding D. In effect, the winding D may be regarded as a closed secondary winding of a transformer wherein the winding of the reactor A is the primary winding. In a reactor the resistance losses are small compared to the reactive volt-amperes. It will be assumed that the primary winding has N turns, an inductive reactance X, and a resistance R, whereas the secondary winding D has $n$ turns and a resistance $r$. The total loss of the compensated reactor then is proportional substantially to $$I^2\left(R+\frac{n^2X^2}{N^2r}\right)$$

If a material such as copper is employed for the windings the term R increases as the temperature of the windings rises whereas the term $$\frac{n^2X^2}{N^2r}$$

simultaneously decreases. The turn ratio and the value of $r$ are so proportioned or adjusted that an increase in temperature of the windings produces substantially equal and opposite changes in the two terms. Under these circumstances the effective resistance of the unit is substantially independent of temperature.

In Fig. 1 the invention is applied to an induction electrical device which may be employed as an induction watthour meter. The meter includes a magnetic structure 1 which includes a continuous perimetric portion 2 from which projects inwardly a voltage pole piece 3 and two current pole pieces 5 and 7. The voltage pole piece has a pole face which is spaced from the pole faces of the current pole pieces to define a main air gap 9.

A voltage winding 11 surrounds the voltage pole piece 3 and may be connected for energization in accordance with the voltage across two conductors L1 and L2 of an alternating current circuit. Although the frequency and voltage of the circuit may vary in accordance with the requirements, it will be assumed that the circuit is a conventional 120-volt circuit operating at a conventional power frequency of 60 cycles per second. Current windings 13 and 15 are associated respectively with the current pole pieces and are connected for energization in accordance with current flowing in the circuit represented by the conductors L1 and L2.

When energized, the windings produce a shifting magnetic field in the air gap 9. An electroconductive armature which may take the form of an aluminum or a copper disc 17 has a portion thereof mounted in the air gap 9 for the purpose of developing a torque which is dependent on the shifting magnetic field. Conveniently, the armature 17 may be secured to a shaft 19 which is mounted for rotation relative to the magnetic structure 1 by means of suitable bearings 21 and 23.

For proper operation of the meter, the voltage magnetic flux which is directed through the armature 17 by the voltage winding 11 should be related properly in phase to the current magnetic flux produced by the windings 13 and 15. In a conventional induction watthour meter, this relationship is such that for a unity power factor load connected to the conductors L1 and L2 the driving voltage magnetic flux is displaced in phase from the current energizing the windings 13 and 15 by 90°.

In order to establish the proper phase relationship, it is conventional practice to provide the magnetic structure 1 with leakage paths for voltage magnetic flux by means of magnetic elements or voltage control sections 25 and 27 which project inwardly from the perimetric portion 2 and which are spaced respectively from opposite sides of the voltage pole piece 3 by small leakage air gaps 25a and 27a. These sections direct a major proportion of the voltage magnetic flux away from the armature 17 and provide a voltage winding 11 having a large inductive reactance. Consequently, the driving voltage magnetic flux entering the armature 17 lags the voltage applied to the voltage winding by a substantial angle. To increase the angle of lag, it is conventional practice to provide a closed electroconductive lagging winding 29 which surrounds the voltage pole piece 3 adjacent the air gap 9. This lagging winding serves to lag still further the driving voltage magnetic flux and may be employed for bringing the driving voltage magnetic flux substantially into quadrature with the voltage applied to the winding 11.

If the meter is to be employed for a circuit wherein the voltage varies over a substantial range in magnitude, it may be desirable to provide compensation for the failure of the driving voltage magnetic flux to increase linearly with the magnitude of the voltage applied to the winding 11. Such compensation may be introduced by means of holes 31 and 33 which decrease the cross-section of the voltage control sections and cause these sections to saturate as the voltage increases within the rated range of the variation of the applied voltage. The saturation of the voltage control sections directs an increased proportion of the voltage magnetic flux through the armature 17.

The components of Fig. 1 which thus far have been specifically described are well known in the art. For this reason, a more detailed discussion thereof is deemed unnecessary. It will be understood that a conventional overload shunt (not shown) may be employed between the upper ends of the current pole pieces. Also a conventional damping permanent magnet (not shown) may be employed for establishing a permanent magnetic field for the armature 17.

The structure of Fig. 1 thus far specifically described does not provide accurate operation over a substantial variation in temperature of the meter. One of the reasons for the inaccurate operation resides in the substantial temperature coefficients of resistance found in conventional electroconductive materials employed for the winding 11. For example, copper, which is uniformly used for the winding 11, has a high positive temperature coefficient of resistance. A further source of error resides in the temperature coefficient of resistance of the lagging winding 29 which for conventional materials also is positive. Because of the presence of these temperature coefficients of resistance, the phase displacement between the driving voltage magnetic flux which enters the armature 17 and the voltage applied to the winding 11 varies as a function of temperature.

In order to provide temperature compensation for the meter, closed electroconductive or lagging windings 35 and 37 are placed around the voltage control sections 25 and 27, respectively. By proper selection of the electrical characteristics for the lagging windings 35 and 37, and the lagging winding 29 the performance of the meter may be improved. The characteristics desired for the windings 35 and 37 may differ from those desired for the winding 29. Thus in order to provide Class 2 temperature compensation for the meter herein described, the lagging windings 35 and 37 are constructed of a material having a temperature coefficient of resistance which is higher than the temperature coefficient of resistance of the material employed for the lagging winding 29. As a specific example, the lagging windings 35 and 37 may be constructed of copper which has a substantial positive temperature coefficient of resistance, whereas the lagging winding 29 may be constructed of an alloy of copper, such as brass or bronze, having a comparatively low temperature coefficient of resistance.

A change in temperature varies the resistance of the voltage winding and tends to produce a corresponding change in phase of the magnetic flux produced thereby. However the substantial temperature coefficient of resistance of the lagging windings 35 and 37 operates in response to the change in temperature to move the main flux in the opposite direction in phase sufficiently to correct for the effect of the voltage winding resistance.

The relationship of the various lagging windings may be understood by a consideration of the main magnetic fluxes produced by energization of the voltage winding 11. Such energization of the voltage winding produces a driving voltage magnetic flux which passes through the armature 17 and which is represented in Fig. 1 by dotted lines $\phi 1$ and $\phi 2$. It will be noted that the lagging windings 29 links the driving voltage magnetic flux represented by the dotted lines $\phi 1$ and $\phi 2$.

Energization of the voltage winding also produces leakage voltage magnetic flux which is represented in Fig. 1 by dotted lines $\phi 3$ and $\phi 4$. It will be noted that the lagging winding 35 links the leakage magnetic flux $\phi 3$, whereas the lagging winding 37 links the leakage magnetic flux $\phi 4$. This leakage voltage magnetic flux represents a major proportion of the total magnetic flux produced by energization of the voltage winding 11.

Current flowing in the lagging windings also may produce magnetic flux which is represented by dotted lines $\phi 5$ and $\phi 6$. The flux $\phi 5$ links the lagging windings 35 and 29, whereas the flux $\phi 6$ links the lagging windings 37 and 29. However, the paths traversed by the fluxes $\phi 5$ and $\phi 6$ include two air gaps in series which offer substantial reluctance to such magnetic fluxes.

Although by proper selection of the materials and proportions of the lagging winding it is possible to obtain good Class 2 temperature compensation over a substantial range of temperature, such as from $-20°$ C. to $+50°$ C., it is desirable to provide an adjustment for the lagging windings. Such an adjustment may be provided conveniently by varying the amount of flux which links the lagging windings 35 and 37. For example, the lagging winding 35 may be proportioned for insertion in the leakage air gap 25a, whereas the lagging winding 37 may be proportioned for reception in the leakage air gap 27a. By moving each of the lagging windings through the associated leakage air gap, the amount of magnetic flux linked by each of the windings may be independently adjusted. Such an adjustment in the amount of magnetic flux corresponds to an adjustment in resistance of the lagging winding.

If the lagging windings 35 and 37 are dissimilar, or if they are similar but are adjusted to link different amounts of magnetic flux, an asymmetric distribution of magnetic flux results, and this asymmetric distribution may be employed for controlling the light load performance of the watthour meter.

Preferably, the lagging windings 35 and 37 are similar in construction, and they are adjusted similarly. A construction which facilitates similar adjustment of the lagging windings is illustrated in Figs. 2 and 3.

In Fig. 2, the magnetic structure 1, the voltage winding 11, the current windings 13 and 15, and the lagging winding 29, again are illustrated. However, the lagging windings 35 and 37 are replaced in Fig. 2 by two lagging windings 35A and 37A which are positioned respectively in the leakage air gaps 25a and 27a. Conveniently, the lagging windings 35A and 37A may be constructed as a unitary winding unit 41 which is illustrated in perspective in Fig. 3. The winding unit 41 may be constructed from a channel of electroconductive material, such as copper. This channel includes a web 41A and flanges 41B and 41C. It will be noted that the ends of the channel are bent substantially at right angles to the remainder of the channel to provide two substantially parallel legs 43 and 45. The winding unit thus has a substantially U-shaped configuration. It will be noted that in the resultant winding unit, the entire flange 41B is in a plane which is parallel to a second plane containing the entire flange 41C, the planes being spaced by the web 41A.

As representative of suitable values, for a conventional meter of the type described in Catalog Section 42–110, dated June 2, 1950, and published by the Westinghouse Electric Corporation, Newark, New Jersey, and listed in the Electrical Metermen's Handbook, sixth edition, 1950, published by Edison Electric Institute, New York city, pages 432, 434, the winding unit may be bent from a sheet of copper having a thickness of 0.010 inch.

The portion of the web 41A which is located in the leg 43 has a window 47 cut therethrough to form the lagging winding 35A. In a similar manner, the portion of the web located in the leg 45 has a window 49 cut therethrough to form the lagging winding 37A.

When the winding unit is to be mounted on the magnetic structure 1, the ends of the web are inserted respectively in the leakage air gaps 25a and 27a. Since the flanges project outwardly from the web, the voltage control sections are received between the flanges 41B and 41C.

The amount of leakage magnetic flux linked with the windings 35A and 37A may be adjusted by movement of the winding unit 41. By partially withdrawing the unit, the amount of magnetic flux linked with the lagging windings 35A and 37A may be decreased.

Conveniently, the winding unit has a free position, such that portions thereof must be displaced from the free position during the mounting operation. The resilience of the material then serves to maintain the winding unit in any position of adjustment. However, if desired, any suitable clamp may be provided for securing the winding unit in any adjusted position.

If desired, the winding unit 41 may be insulated from the magnetic structure 1. For example, the winding unit may be covered with a thin layer of insulating material, such as a coating of an insulating varnish or lacquer.

Although the invention has been described with reference to certain specific embodiments thereof, numerous modifications falling within the spirit and scope of the invention are possible. For this reason, the foregoing descriptions are to be construed in an illustrative rather than in a limiting sense.

I claim as my invention:

1. In a reactive impedance device, a main winding having a positive temperature coefficient of resistance, a magnetic structure establishing first and second parallel paths for magnetic flux produced by electrical current flowing through the winding, said second path for magnetic flux including an air gap, a first closed winding linked with first magnetic flux flowing in the first path, and a second closed winding linked with second magnetic flux flowing in the second path, said closed windings having predetermined different temperature coefficients of resistance proportioned to maintain a predetermined phase relationship between the voltage applied to said winding and magnetic flux flowing in the first path over a substantial range of variation of temperature, said second closed winding being movable through said air gap to vary the amount of magnetic flux linked thereby.

2. In an electrical instrument, a symmetric magnetic structure having a voltage pole piece, a voltage winding having a positive temperature coefficient of resistance surrounding said voltage pole piece, said magnetic structure including first and second voltage control paths establishing parallel paths for portions of the magnetic flux passing through the voltage pole piece, said control paths being saturable within the range of voltage for which the winding is rated to maintain a substantially predetermined relationship between the voltage and the magnetic flux passing through the pole face of the pole piece, first and second similar closed windings respectively linked with the magnetic fluxes flowing through said first and second voltage control paths, and a third closed winding linked with magnetic flux passing through the pole face of the pole piece, said third closed winding having a temperature coefficient of resistance smaller than that of the first and second closed windings to maintain a predetermined phase relationship between the magnetic flux passing through the pole face and alternating voltage applied to the voltage winding over a substantial range of temperature.

3. In an electrical instrument, a symmetric magnetic structure having a voltage pole piece, a voltage winding surrounding said voltage pole piece, said magnetic structure including first and second voltage control paths establishing parallel paths in a common plane for portions of the magnetic flux passing through the voltage pole piece, said control paths being saturable within the range of voltage for which the winding is rated to maintain a substantially predetermined relationship between the voltage and the magnetic flux passing through the pole face of the pole piece, said first and second voltage control paths having respectively first and second air gaps, a winding unit comprising first and second similar closed windings respectively linked with the magnetic fluxes flowing through said first and second voltage control paths, said first and second closed windings being movable as a unit in a direction transverse to said plane respectively through the first and second air gaps, and said winding unit comprising a connector mechanically connecting one end of each of the closed windings to define a U-shaped winding unit.

4. An electrical induction instrument, comprising a magnetic structure having a main air gap, said magnetic structure including a voltage pole piece and a pair of current pole pieces having pole faces bordering said air gap, a voltage winding having a positive temperature coefficient of resistance associated with the voltage pole piece, current windings associated with the current pole pieces, said magnetic structure including first and second control paths for directing magnetic flux produced by energization of the voltage winding away from the air gap, a first closed electroconductive winding linked with magnetic flux passing through the pole face of the voltage pole piece and the air gap, said voltage and current windings when energized by alternating quantities being effective for producing a shifting magnetic field in the air gap, an electroconductive armature, and means mounting the electroconductive armature in the air gap for rotation relative to the magnetic structure by the shifting magnetic field, in combination with a second closed electroconductive winding liked with magnetic flux flowing in the first control path, a third closed electroconductive winding linked with magnetic flux flowing in the second control path, said first closed electroconductive winding having a temperature coefficient of impedance lower than the temperature coefficients of impedance of the second and third closed electroconductive windings to maintain a predetermined relationship between voltage magnetic flux entering the armature and alternating-voltage applied to the voltage winding over a substantial range of temperature.

5. An electrical induction instrument, comprising a magnetic structure having a main air gap, said magnetic structure including a voltage pole piece and a pair of current pole pieces having pole faces bordering said air gap, a voltage winding having a positive temperature coefficient of resistance associated with the voltage pole piece, current windings associated with the current pole pieces, said magnetic structure including first and second control paths having respectively first and second air gaps for directing magnetic flux produced by energization of the voltage winding away from the air gap, a first closed electroconductive winding linked with magnetic flux passing through the pole face of the voltage pole piece and the air gap, said voltage and current windings when energized by alternating quantities being effective for producing a shifting magnetic field in the air gap, an electroconductive armature, and means mounting the electroconductive armature in the air gap for rotation relative to the magnetic structure by the shifting magnetic field, in combination with a second closed electroconductive winding linked with magnetic flux flowing in the first control path and mounted for movement through the first air gap to adjust the amount of magnetic flux in the first control path which links the second closed electroconductive winding, a third closed electroconductive winding linked with magnetic flux flowing in the second control path and mounted for movement through the second air gap to adjust the amount of magnetic flux in the second control path which links the third electroconductive winding, said first closed electroconductive winding having a temperature coefficient of impedance lower than the temperature coefficients of impedance of the second and third closed electroconductive windings to maintain a predetermined relationship between voltage magnetic flux entering the armature and alternating voltage applied to the voltage winding over a substantial range of temperature.

6. An electrical induction instrument, comprising a magnetic structure having a main air gap, said magnetic structure including a voltage pole piece and a pair of current pole pieces having pole faces bordering said air gap, a voltage winding having a positive temperature coefficient of resistance associated with the voltage pole piece, current windings associated with the current pole pieces, said magnetic structure including first and second control paths having respectively first and second air gaps, said first and second air gaps being positioned on opposite sides of the voltage pole piece for directing magnetic flux produced by energization of the voltage winding away from the air gap, a first closed electroconductive winding linked with magnetic flux passing through the pole face of the voltage pole piece and the air gap, said voltage and current windings when energized by alternating quantities being effective for producing a shifting magnetic field in the air gap, an electroconductive armature, and means mounting the electroconductive armature in the air gap for rotation relative to the magnetic structure by the shifting magnetic field, in combination with a winding unit comprising a second closed electroconductive winding linked with magnetic flux flowing in the first control path and mounted for movement through the first air gap to adjust the amount of magnetic flux in the first control path which links the second closed electroconductive winding, a third closed electroconductive winding linked with magnetic flux flowing in the second control path and mounted for movement through the second air gap to adjust the amount of magnetic flux in the second control path which links the third electroconductive winding, said first closed electroconductive winding having a temperature coefficient of impedance lower than the temperature coefficients of impedance of the second and third closed electroconductive windings to maintain a predetermined relationship between voltage magnetic flux entering the armature and alternating voltage applied to the voltage winding over a substantial range of temperature.

7. A winding unit for lagging a plurality of magnetic fluxes in an electrical instrument, comprising an electroconductive channel having a web and flanges projecting from the web, said channel having its ends bent to provide substantially parallel spaced legs, each flange of the channel as bent being maintained substantially in a plane, the two planes of the flanges being spaced by the web of the channel, and a separate window in the web portion of each of the legs to define a closed electroconductive winding.

8. A winding unit for an electrical instrument having a magnetic pole piece and first and second magnetic elements terminating adjacent opposite sides of the pole piece to define first and second air gaps, said winding unit comprising an electroconductive channel having a web and flanges, said channel being bent to provide substantially parallel first and second spaced legs, the flanges of the legs extending outwardly from the associated web portions whereby the web portions of the first and second legs may be inserted respectively in the first and second air gaps with each of the magnetic elements being received between the flange portions of the associated leg, the web portion of each of said legs having a window defining a closed winding, whereby magnetic flux passing between the pole piece and each of the magnetic elements may be linked with one of the closed windings.

References Cited in the file of this patent

UNITED STATES PATENTS

| | | |
|---|---|---|
| 853,218 | Bradshaw | May 14, 1907 |
| 1,573,546 | Harris | Feb. 16, 1926 |
| 1,654,306 | Paszkowski | Dec. 27, 1927 |
| 1,695,861 | Rutter | Dec. 18, 1928 |
| 1,695,878 | Callsen | Dec. 18, 1928 |
| 2,181,644 | Seifert | Nov. 28, 1939 |
| 2,328,728 | Leippe | Sept. 7, 1943 |
| 2,363,284 | Barnes | Nov. 21, 1944 |

FOREIGN PATENTS

| | | |
|---|---|---|
| 171,836 | Great Britain | Dec. 1, 1921 |
| 378,063 | Germany | July 7, 1923 |